United States Patent [19]

Bhushan

[11] 4,269,426
[45] May 26, 1981

[54] TRACTOR/TRAILER SAFETY DEVICE

[76] Inventor: Bharat Bhushan, 1014 Longspur Rd., Audubon, Pa. 19403

[21] Appl. No.: 13,299

[22] Filed: Feb. 21, 1979

[51] Int. Cl.$^3$ .............................................. B62D 53/06
[52] U.S. Cl. .................................... 280/432; 116/32; 188/4 R; 340/687
[58] Field of Search ............ 280/432; 340/52 R, 686, 340/687; 116/28 R, 32; 188/4 R

[56] References Cited

U.S. PATENT DOCUMENTS

| 2,473,050 | 6/1949 | Camp | 116/32 X |
| 2,815,224 | 12/1957 | Waters | 280/432 |
| 2,868,333 | 1/1959 | Willison | 188/4 R |
| 4,052,695 | 10/1977 | Myers | 280/432 |

FOREIGN PATENT DOCUMENTS 2242407  3/1974  Fed. Rep. of Germany ........ 116/28 R

OTHER PUBLICATIONS

Design Synthesis of Safety Devices on a Logging Trailer: Part I, Bhushan and Feder, Apr. 1975, ASME Publication 75-DE-54.
Design Synthesis of Safety Devices on a Logging Trailer: Part II, Bhushan, Apr. 1975, ASME Publication 75-DE-55.

Primary Examiner—John A. Pekar
Attorney, Agent, or Firm—John M. Neary

[57] ABSTRACT

A tractor/trailer safety device includes a control mounted in the cab for operation by the driver, when he feels the trailer beginning to jackknife, to disconnect the trailer from the tractor. The control connects a source of pneumatic pressure to a piston which, when operated, lifts a bearing pin to separate the trailer from the tractor. Momentarily afterward, a pair of skid plates attached by chains are released and guided to drop in front of the front wheels of the trailer and the emergency brakes are applied to bring the trailer to a fast halt. Simultaneously, a warning flasher and distress signal system on the trailer is actuated to warn traffic and summon assistance.

8 Claims, 6 Drawing Figures

TRACTOR/TRAILER SAFETY DEVICE

BACKGROUND OF THE INVENTION

This invention relates to tractor/trailer safety devices, and more particularly to a device under driver control for disconnecting a trailer from its tractor when the driver anticipates that the rig is going to jacknife or overturn.

Logging trailers are used to haul logs from the logging site along mountain roads to the lumber mill. The trailers are often loaded high with the heavy logs which makes the trailer difficult to control in certain situations. The roads are often of poor design and maintenance, with sharp switchbacks and poor grading on a steep run. The drainage is frequently arranged too closely to the roadway so that erosion after a heavy rain can cause undetected weakening of the roadbed.

The result of these factors is a condition of serious danger to a logging trailer driver who is less than perfectly attentive to his driving, or who is in a hurry. Undue speed around a sharp switchback, or a wheel slipping off the roadway into a drainage ditch is often enough to cause the heavy rig to jacknife. There is nothing the driver can do at this point except jump if he can, or stay in the cab and hope it protects him.

The period of time between the moment when the driver is aware that the rig is going to jacknife, and when the jacknifing trailer forces over the tractor is long enough for the driver to take some corrective action, if such action is available. Heretofore, however, there has been nothing the driver could do except jump or pray.

SUMMARY OF THE INVENTION

Accordingly, it is an object of this invention to provide a tractor/trailer safety device that will enable the driver to disconnect a loaded trailer from his tractor when he senses that the trailer is beginning to jacknife, so that he may maneuver the tractor to safety. The system includes a provision for releasing and guiding a pair of skid plates to drop in front of the front wheels of the trailer and then applying the brakes automatically in sequence when the trailer wheels roll onto the skid plates and bring the trailer to a safe quick halt. An emergency light flasher and radio distress call system activated by the same action that initiated the tractor/trailer separation is provided to give immediate warning to other traffic on the road and to summon help for the driver.

These and other objects of the invention are achieved in the preferred embodiment of the invention by a pneumatically operated, spring biased piston connected to a bearing pin which connects the trailer "saucer" to the "cup" on the tractor frame. A manually operated control actuated by the driver when he feels the trailer start to jacknife lifts the bearing pin to separate the tractor and trailer, and simultaneously releases a pair of skid plates, guided to drop in front of the front wheels on the trailer. The trailer wheels roll onto the skid plates and the trailer then separates from the tractor. An auxiliary powered flasher system is activated on the trailer now disconnected from the tractor electrical system to warn other traffic on the road, and an emergency radio is provided to summon help. The disconnected air line applies the trailer air brakes to assist in slowing the trailer. The entire sequence is controlled to occur in an order that militates for maximum stability of the separated trailer so that it does not overturn, and skid or roll after disconnecting and for maximum control by the driver of his tractor so that he is able to maneuver to safety.

DESCRIPTION OF THE DRAWINGS

The objects of the invention will become more clear upon reading the following description of the preferred embodiment in conjunction with an examination of the drawings, wherein.

DESCRIPTION OF THE PREFERRED EMBODIMENT

Figure 1:
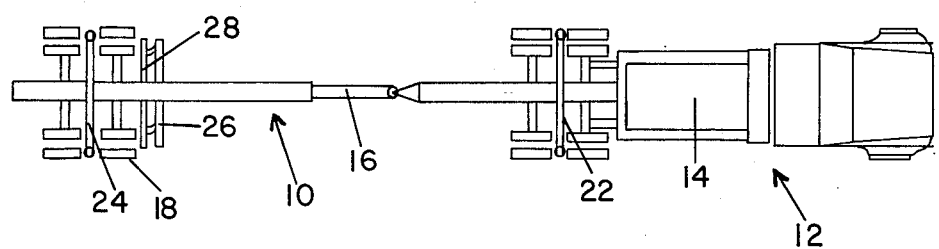
FIG. 1 is a plan view of a logging tractor/trailer rig incorporating this invention.

Referring now to the drawings, wherein like reference characters designate identical or corresponding parts, and more particularly to FIG. 1 thereof, the invention is embodied in a logging tractor/trailer rig having a trailer 10 drawn by a tractor 12. The trailer is connected to the tractor at a cup and saucer connection 14. The trailer includes a reach pole 16 extending forwardly from the trailer wheels 18 to the saucer 20 at its front end. A front bunk 22 and a rear bunk 24 are fastened to the reach pole 16 for supporting the logs carried by the trailer, and a pair of cross poles 26 and 28 are fastened rigidly to the reach pole 16 to support a skid plate 30 in front of the wheels 18 to aid in stopping the trailer, as described in detail below.

Figure 2:
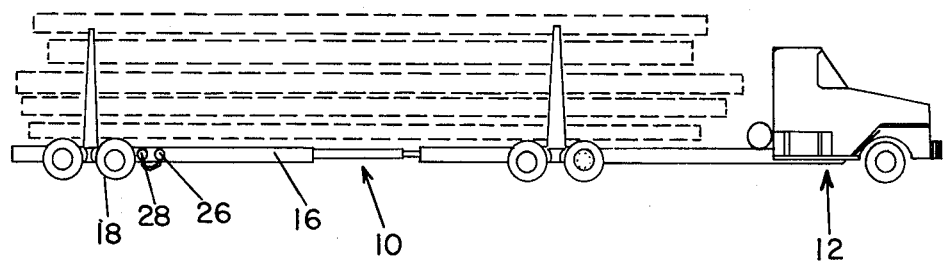
FIG. 2 is an elevation of the tractor/trailer rig shown in FIG. 1.
Figure 3:
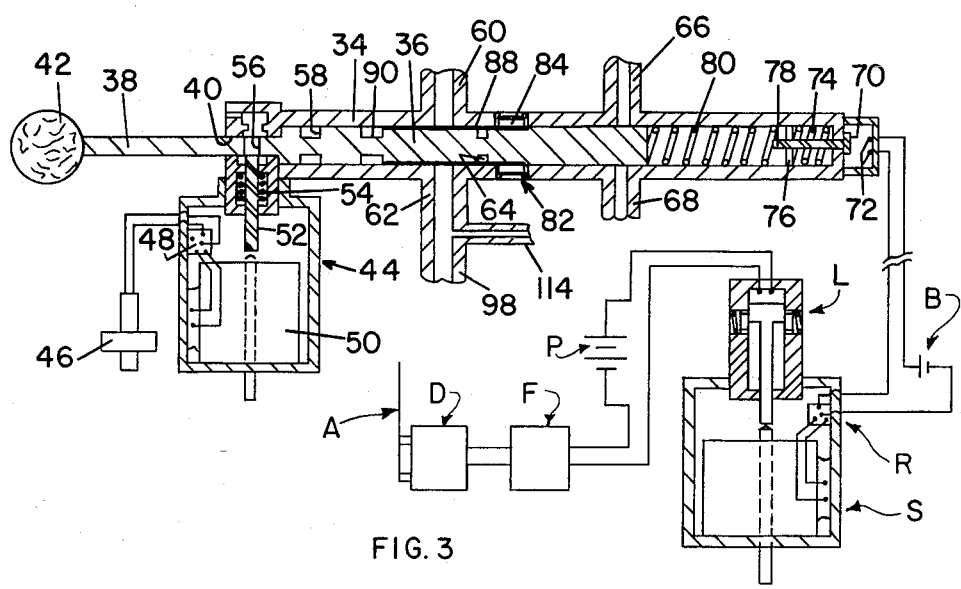
FIG. 3 is a sectional view of the manually operated control which the driver uses to initiate trailer separation, and its associated electrical controls for the emergency flasher and radio system.

When the driver of the rig shown in FIGS. 1 and 2 perceives that the trailer is starting to topple or jacknife, he activates a control shown in FIG. 3. The control causes the cup and saucer connection between the tractor and trailer to open so that the tractor 12 is not overturned by the jacknifing trailer, and causes the skid plates 30 to drop in front of the wheels 18 which roll onto the skid plates but not beyond because of chains 31 connecting the skid plates to the cross pole 26, so the trailer brakes are automatically applied and an emergency flasher and radio call signal on the trailer is energized to warn other traffic on the road and summon help.

The control shown in FIG. 3 includes a cylindrical barrel 34 which holds a closely fitting plunger 36. A rod 38 extends forwardly from the front end of the plunger 36 and through a closely fitting opening 40 at the front end of the rod 38 which the driver pushes when he wants to disconnect the trailer from the tractor.

A lockout system 44 is provided for preventing activation of the disconnect system at high speed where its operation would be unsafe. The lockout system includes a speed sensor 46 which generates an electrical signal to a relay 48 when a predetermined speed, in this case forty MPH, has been reached. The relay 48 energizes a solenoid 50 which raises a lockout pin 52 against a biasing spring 54 through a hole 56 in the rod 38 to prevent the rod 38 and plunger 36 from moving inward after the lockout speed has been reached. When the speed falls below the lockout speed, the signal from the speed sensor 46 ends, the relay deenergizes the solenoid 50, and the spring 54 returns the pin 52 to its lower position clear of the hole 56.

The plunger 36 includes an annular groove 58 which aligns with a pair of high pressure gas lines 60 and 62 to establish gas flow communication between the gas lines when the plunger 36 is pushed in fully. The gas line 60 is connected to a source of high pressure gas, such as a nitrogen gas tank at 3,500 psi. The gas line 62 is connected to a cup and saucer disconnect device shown in FIG. 5, both of which are described below.

A second annular groove 64 is formed in the plunger 36 and aligns with a pair of air lines 66 and 68 on opposite sides of the barrel 34 for establishing air flow communication between the lines 66 and 68 when the plunger is pushed in fully. The air line 66 is connected to the air brakes on the trailer wheels 18 and the line 68 vents to atmosphere, so that when the plunger 36 is pushed in, the brake's air pressure is released through the line 68 to the atmosphere. The groove 64 is a small one and constitutes a restriction in the brake air line 66, so the brakes are applied gradually. This ensures that the wheels 18 do not lock but continue to roll so that they will provide optimum static friction with the road, and so that the front pair of trailer wheels will roll onto the skid plate 30, as described below.

An electrical contact member 70 is mounted in the rear end of the barrel 34 opposite a pair poles 72. The contact member 70 is held in its retracted position, shown in FIG. 3. by a spring 74 compressed between the end of the barrel 34 and a washer 76 attached to a rod 78 extending from the contact 70 through a hole in the end of the barrel 34 and into the barrel. A spring 80 compressed between the end of the plunger 36 and the washer 76 holds the plunger 36 in its extended position shown in FIG. 3 until it is pushed firmly inward by the driver, whereupon the increased force exerted by the now tightly compressed spring 80 overpowers the smaller spring 74 to move the contact member 70 to bridge the poles 72 of the switch to energize a relay switch R which connects a battery B into a solenoid circuit and moves the plunger of a solenoid S to operate a lock-on switch L which in turn completes a circuit containing an emergency flasher F and a distress radio signal system D powered by a self-contained power pack P.

A detent and guide 82 is provided in the wall of the barrel 34 to lock the plunger in its operated position after it has been pushed fully inward, and to prevent the plunger from rotating in the barrel 34 which would cause failure of the lockout system. The detent and guide 82 includes a ball 84 mounted in a small cavity in the inner wall of the barrel 34 and biased by a spring into a shallow groove 88 which runs along the plunger 36, and terminating in a notch 90 into which the ball 84 fits to hold the plunger in its innermost or operated position against the returning force of the spring 80.

Figure 4:
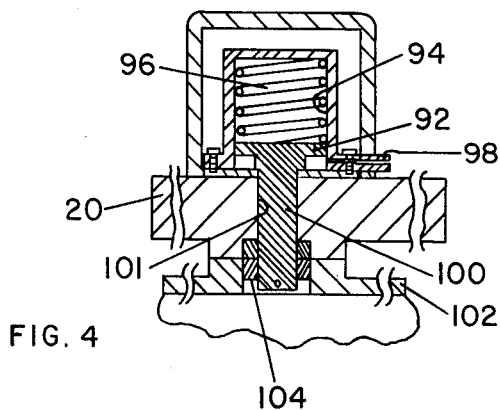
FIG. 4 is a sectional elevation of the pneumatically operated piston and bearing pin that holds the trailer to the tractor until it is operated by the driver.

The cup saucer disconnect device shown in FIG. 4 includes a piston 92 slidably contained within a cylinder 94 and biased in the lowermost position illustrated by a spring 96. A gas line 98 is connected between the lower end of the cylinder 94 and the gas line 62 to pressurize the cylinder when the plunger 36 of the control shown in FIG. 3 is pushed in. A bearing pin 100 extends into a hole in the cup 102 which is mounted on the frame of the tractor 12. A shear pin 104 extends laterally through the lower end of the bearing pin 100 and slightly beyond its periphery. The size of the pin is selected to ensure that it does not shear during operation over bumpy roads. A heavy metal shroud covers the cylinder 94 to protect it from damage by the logs.

In operation, when the plunger 36 is pushed in by the driver, gas communication is established from the nitrogen tank via gas line 60, groove 58, gas line 62 and gas line 98 to the interior of the cylinder 94. The high pressure gas lifts the piston 92, shearing the shear pin 104 and mechanically disconnecting the saucer 20 from the cup 102 so that the saucer can lift away from the cup and the trailer is then disconnected from the tractor.

Figure 5:
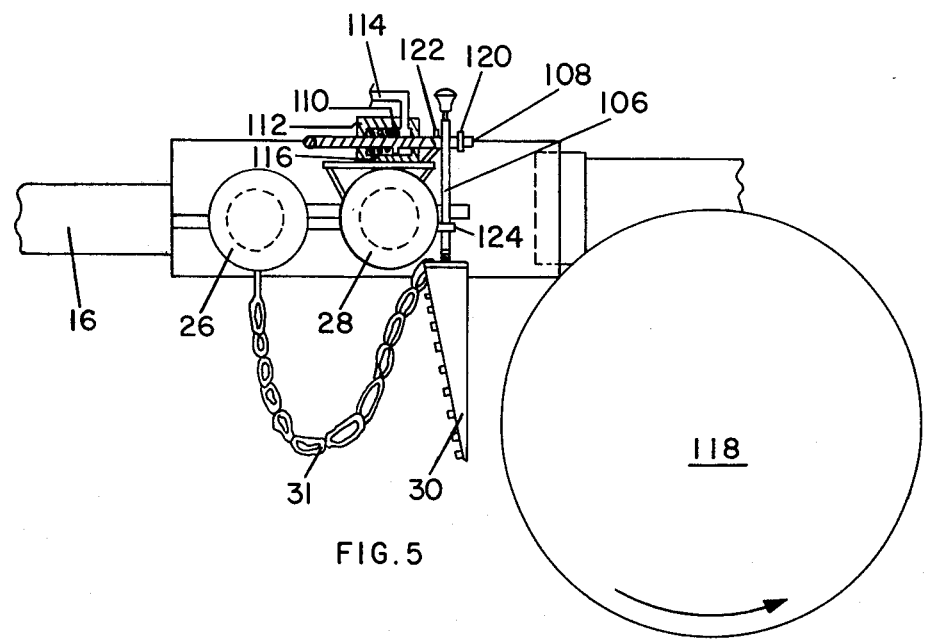
FIG. 5 is an elevation, partly in section of the skid plate mounted in front of the front trailer wheels, and the release mechanism and guide assembly.
Figure 6:
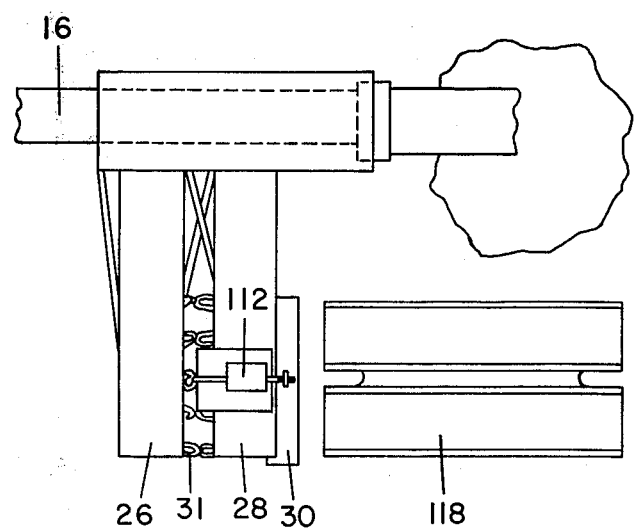
FIG. 6 is a plan view of the assembly shown in FIG. 5.

To ensure that the trailer is brought to a fast and controlled halt after it has been disconnected from the tractor, a skid plate system is provided, as best shown in FIGS. 5 and 6. It includes a pair of skid plates 30, one each suspended in front of the trailer wheels 18 on each side of the trailer. A set of strong chains 31 is attached between the forward cross pole 26 and the top end of the skid plate 30 on each side of the trailer. The skid plate is hung from the rear cross pole 28 on a releasable suspension and guide system which includes a telescoping guide rod 106 suspended from a rod 108 extending rearward from a piston 110 mounted within a cylinder 112. A gas line 14 connects the cylinder 112 to the gas line 62 so that the cylinder is pressurized when the control is operated, moving the piston 110 forwardly against the biasing force of the spring 116. The rod 108 includes a transverse shear pin 120 to prevent accidental disengagement of the rod 106.

When the cylinder 112 is pressurized, the rod 108 is moved forcefully forward. The shear pin 108 is sheared in the process, the reaction force being provided by a mounting bracket 122. When the rod 108 is drawn clear of rod 106, the heavy skid plates 30 drop downwardly, guided by the rod 106 sliding through a hold in the guide bracket 124. This ensures that the skid plates will drop directly in front of the wheels 118 regardless of the motion of the trailer.

The safety device disclosed herein is a safe and reliable solution to the longstanding problem of trailer jacknifing. It provides for the correct sequence of operations to cause separation of the trailer from the tractor, placement of trailer skid plates and application of trailer brakes to ensure safe separation and halting of the trailer, with automatic activation of a warning and distress call system. The safety device can be retrofitted to existing rigs quickly and inexpensively and its use will substantially improve the trucker's sense of security and control, and improve the safety record of this hazardous occupation.

Obviously, numerous modifications and variations of the disclosed embodiment are possible in view of the teachings contained herein.

Therefore, it is to be understood that these and other modifications, and their equivalents, may be practiced while remaining within the spirit and scope of the invention as defined in the following claims, wherein I claim:

1. In a tractor/trailer disconnect system having a pneumatically operated, spring biased piston, to which is connected a bearing pin for mechanically connecting the trailer to the tractor, said bearing pin being secured in a connecting position by a shear pin; a skid plate suspended in front of the wheels of the trailer; a control for venting the trailer air brakes and for connecting a source of gas pressure to the cylinder for moving the piston to shear said shear pin and lift the bearing pin and mechanically disconnect the trailer from the tractor, and for operating a device for releasing the skid plates to drop in front of the trailer wheels; wherein the improvement comprises:

an emergency flasher (F) and power pack (P), including a relay (R) for energizing a solenoid (S), and a switch (L) operated by said solenoid and having a lock on position to keep the emergency flasher unit energized even after the tractor power supply has been disconnected;

a switch (70,72) in said control for connecting said relay (R) to a source (B) of electrical power for energizing said solenoid when said control is operated;

guide means for guiding said skid plates to drop in front of said trailer wheels irrespective of the motion of said trailer;

sequencing means to ensure that said piston is operated to lift said pin first, and then the brakes are applied gradually while the wheels continue to roll onto the skid plate when it drops in front of the trailer wheels, and then the emergency flashers are operated to warn traffic as the trailer comes to a halt.

2. The safety device defined in claim 1, further comprising a radio electrically connected to said flasher system and mechanically supported by said trailer, said radio being connected to an antenna to broadcast a distress signal when said trailer separates from said tractor and said flasher system is energized, whereby assistance will be summoned in the least possible time to remove the disconnected trailer.

3. The safety device defined in claim 1, wherein said sequencing means includes a delay means in the gas line leading to the skid plate release device, whereby said skid plates will be released after said bearing pin has been raised, but before sufficient separation displacement has occurred to cause a rupture of said skid plate release device gas line.

4. The safety device defined in claim 1, wherein said sequencing means includes a restriction in the air lines leading from said trailer brakes, whereby said trailer brakes will be applied gradually upon operation of said control so that the trailer wheels will roll onto said skid plates before sufficient separation displacement has occurred to cause said trailer air brake lines to rupture.

5. The safety device defined in claim 1, wherein said guide means includes a telescoping rod supporting said skid plates, said telescoping rod being supported and held in its collapsed position by a support rod extending through a transverse hole in said telescoping rod, said support having a shear pin extending transversely therethrough which prevents said telescoping rod from slipping off and falling prematurely;

said support rod being connected to a pneumatic piston in a cylinder connected to said control, whereby said cylinder is pressurized when said control is operated, said piston moves in said cylinder and withdraws said support rod from said telescoping rod which extends under the weight of said skid plates to guide said skid plates to fall directly in front of said trailer wheels irrespective of the movement of said trailer.

6. The safety device defined in claim 1, wherein said control further comprises a spring urging a moving member in said control to its inoperative position to prevent accidental operation, and a detent between said moving member and the control housing to latch said moving member in its operated position when it has been operated.

7. The safety device defined in claim 1, wherein said sequencing means includes:

a delay means in the gas line leading to the skid plate release device, and a restriction in the air lines leading from said trailer brakes;

whereby said skid plates will be released after said bearing pin has been raised, but before sufficient separation displacement has occurred to cause a rupture of said skid plate release device gas line, and said trailer brakes will be applied gradually upon operation of said control so that the trailer wheels will roll onto said skid plates before sufficient separation displacement has occurred to cause said trailer air brake lines to rupture.

8. The safety device defined in claim 1, wherein said guide means includes a telescoping rod supporting said skid plates, said telescoping rod being supported and held in its collapsed position by a support rod extending through a transverse hole in said telescoping rod, said support having a shear pin extending transversely therethrough which prevents said telescoping rod from slipping off and falling prematurely;

said support rod being connected to a pneumatic piston in a cylinder connected to said control;

said control further comprising a spring urging a moving member in said control to its inoperative position to prevent accidental operation, and a detent between said moving member and the control housing to latch said moving member in its operated position when it has been operated;

whereby said cylinder is pressurized for sufficient time when said control is operated to move said piston in said cylinder and withdraw said support rod from said telescoping rod, which telescoping rod then extends under the weight of said skid plates to guide said skid plates to fall directly in front of said trailer wheels irrespective of the movement of said trailer.

* * * * *